United States Patent
Jimenez

[11] Patent Number: 5,671,549
[45] Date of Patent: Sep. 30, 1997

[54] STEAM-HEATED CORRUGATING ROLLERS

[75] Inventor: Desiderio Garcia Jimenez, Pamplona, Spain

[73] Assignee: Talleres Irunes, S.A., Pamplona, Spain

[21] Appl. No.: 526,227

[22] Filed: Sep. 11, 1995

[30] Foreign Application Priority Data

Jun. 22, 1995 [ES] Spain ........................................ 9501245

[51] Int. Cl.$^6$ ................................................ D21G 5/00
[52] U.S. Cl. ................................................ 34/125
[58] Field of Search ........................... 34/446, 454, 469, 34/114, 119, 124, 125, 122, 638; 165/89, 90

[56] References Cited

U.S. PATENT DOCUMENTS

| | | | |
|---|---|---|---|
| 1,575,249 | 3/1926 | Berry et al. | 34/124 |
| 3,808,700 | 5/1974 | Kraus | 34/125 X |
| 4,205,457 | 6/1980 | Sjöstrand | 34/125 X |
| 4,476,637 | 10/1984 | Justus et al. | 34/125 X |
| 4,501,075 | 2/1985 | Jenker et al. | 34/125 |
| 5,165,471 | 11/1992 | Atsumi | 34/125 X |
| 5,335,427 | 8/1994 | Partio | 34/124 X |
| 5,564,494 | 10/1996 | Saliminen | 34/125 X |

FOREIGN PATENT DOCUMENTS

| | | |
|---|---|---|
| 31 43 347 | 5/1983 | Germany. |
| WO 90/14468 | 11/1990 | WIPO. |

*Primary Examiner*—John M. Sollecito
*Assistant Examiner*—Steve Gravini
*Attorney, Agent, or Firm*—Gary M. Nath; Nath & Associates

[57] ABSTRACT

An improved steam heated corrugating roller includes an inner heating steam chamber constructed with a longitudinal cone shape with the exit for condensates at the wider end. Conduits are connected through the wider ends to a ring shaped housing. A ring is placed in the housing and includes several independent sectors which allow for radial movement between two positions vis a vis the bottom of the housing. This allows the conduits to remain open when the roller is spinning and closed when it is not spinning.

5 Claims, 4 Drawing Sheets

STEAM-HEATED CORRUGATING ROLLERS

Improvements on steam-heated corrugating rollers, according to which the inner heating steam chamber (1) is constructed with a certain longitudinal cone shape, with the exit for condensates at the wider end, through conduits (6), which are connected to a ring-shaped housing (7), in which a ring formed by several independent sectors is set, which allows for radial movement between two positions vis-a-vis the bottom of said housing (7), so that the conduits (6) will remain open when the roller is spinning and closed when it is not moving.

MAIN FIGURE: FIG. 1

In certain processes, for example the manufacture of corrugated cardboard, corrugating rollers are used which must be heated to a certain temperature to obtain the results for which they are intended.

The heating of said rollers is accomplished conventionally by introducing steam inside an inner chamber in the rollers, so that heating is produced by the condensation of saturated steam, which must be supplied constantly during operation so that the heat supply is constant.

The change in state now produced by condensation means that with this system of condensation, both steam and liquid produced by the condensates mix and disperse in the interior of the rollers; the steam and liquids, although being at the same temperature, behave differently, so that steam condensation on the metal walls of the roller transfers several times the heat as condensate at the same temperature.

As a result of this difference of heat transfer, temperature differences are produced on the parts of the rollers heated by steam and by condensate, which deforms (twists) the rollers, a phenomenon known as the "banana effect," so that, for example, in a roller 305 mm in diameter by 2,500 mm in length, with a difference of only 10° C., a deformation of more than 3 mm is produced; while a deformation of only two or three hundredths of a mm are allowed for the corrugating rollers in question.

Therefore, a rapid and correct evacuation of the condensates is indispensable, for which purpose a system incorporating a siphon tube in the inside of the rollers is used; this solution presents the problem of siphon tube fragility and frequent reduced operating effectiveness, due to the difficulty in maintaining a small separation between the fixed end of the reducing tube and the spinning wall of the corresponding roller.

Other solutions have likewise been developed, for example that of U.S. Pat. No. 1,575,249, in which the extraction of the condensates is carried out by holes placed in the ends of the rollers and connected to an outlet set in the spin shaft. This solution in turn presents a problem in that when the roller is stopped, practically all the outlet openings remain open, allowing the steam inside the roller chamber to escape.

Moreover, in all known solutions the inner chamber of the rollers is built cylindrically, causing the ring formed by the condensate as it spins with the roller to vary in thickness toward the most distant points, as said ring forms a displacement slope toward the outlet, which causes heat transfer to vary along the entire roller, as said condensate ring has an insulating effect on the transfer of heat to the roller surface.

For the purpose of overcoming all these problems, according to the present invention, improvements are proposed through which better construction and functionality are obtained in the production of such rollers.

According to the present invention, the improvements claimed literal are obtained by the following solution: the rollers are fitted with outlets for this discharge of condensates through tubes placed in one end of the inner chamber of the roller, with the feature, according to said improvements, of a ring-shaped housing, from which said conduits lead to the respective evacuation outlets. Inside this ring-shaped housing, there is a ring composed of several independent sections or sectors, which have a certain amount of radial space for expansion inside said ring-shaped housing.

In this manner, when the roller is stopped, the sectors that make up the above-mentioned ring place themselves, according to their own weight and owing exclusively to the action of gravity, in the lowest position, closing the upper sectors to the holes that correspond to them in the mentioned condensate outlet, while the sectors that are in the lower middle part leave the holes below the level of the liquid mass of condensate open or partially open, with the result that it prevents steam escaping from the interior of the roller.

When on the other hand the roller is spinning at a certain rate, the centrifugal force places the sectors of the ring in the outermost radial position, leaving open all the condensate outlet holes, allowing its evacuation without difficulty during operation.

Owing to another feature of the invention, the inner chamber of the rollers is built with a somewhat conical bore, thanks to which an imbalance is established, which helps the condensate reach the outlet area, where there is also a groove that serves as a drain to concentrate the condensate and facilitate its evacuation. So that when the roller is stopped, the condensate flows rapidly toward said drain; whereas when the roller is spinning, the thickness of the condensate ring that forms is uniform over the entire length of the chamber, making the transfer of heat from the steam to the roller surface equal at all points.

Using the solution announced here, the following improvements are obtained:

Practical elimination of the "banana effect" during stoppages.

Lower and more uniform thickness of the condensate ring formed inside the rollers due to the effect of the spin.

Maintenance of the dimensional stability of the rollers, practically without alterations.

Higher heat capacity in the rollers due to the diminished thickness of the condensate ring formed when the rollers spin.

Uniform distribution of heat over the total surface of the rollers.

Minimal maintenance needs, due to the simplicity of the component set.

Figure 8:
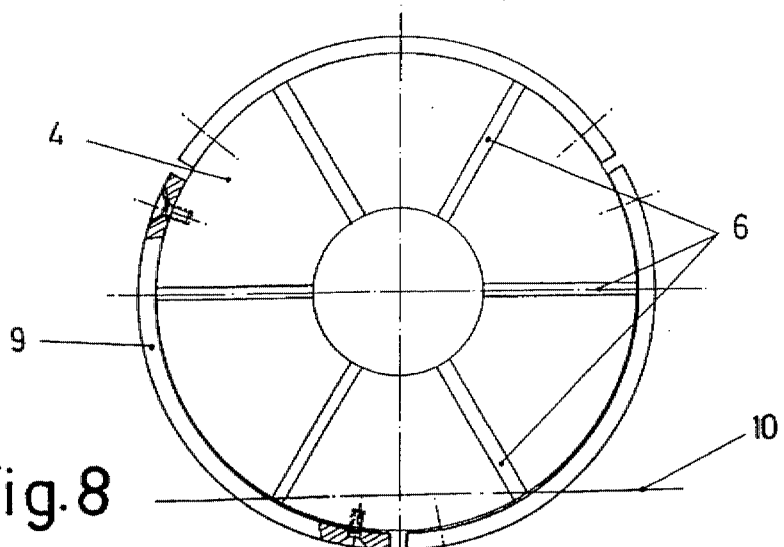
Figure 9:
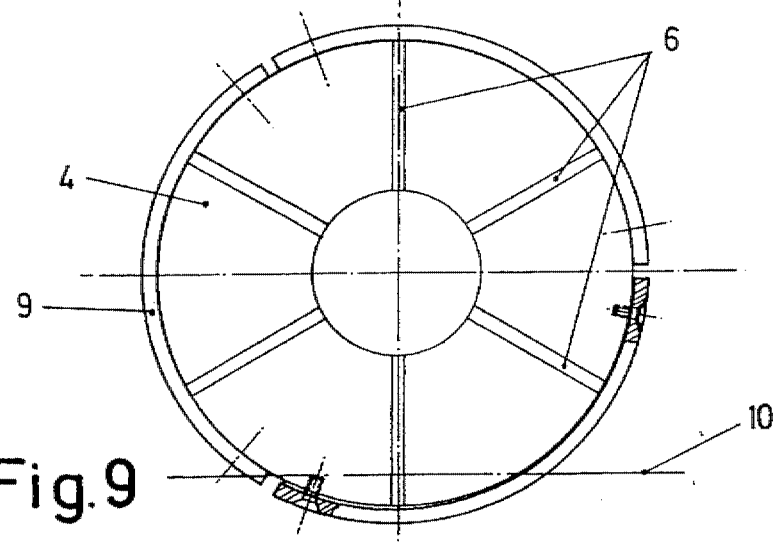
Figure 10:
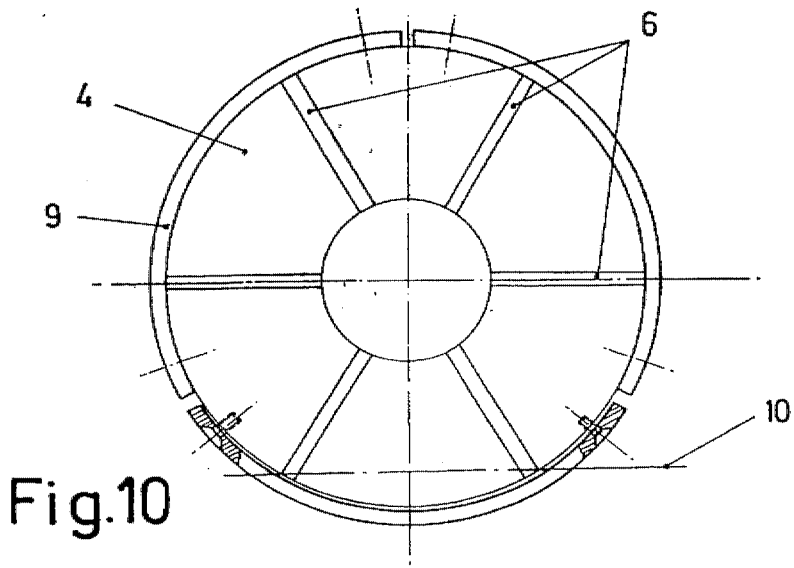

FIGS. 8, 9, and 10 represent different placement possibilities in which the compound ring may rest with respect to the condensate outlet holes when the roller stops.

CLARIFYING DETAILS

1. Heating chamber
2. Roller body
3. Steam intake tube
4. Axle piece
5. Condensate outlet chamber
6. Radial conduits
7. Ring housing
8. Outlet conduits
9. Compound ring
10. Condensate level
11. Fastener holes
12. Drain
13. Disk
14. Tubular rod The purpose of the invention is to make improvements in corrugating rollers used, for example, in the manufacture of corrugated cardboard in which the heating necessary to the function to be carried out is done by introducing steam into a chamber (1) defined axially by the inside of the body (2) of said rollers, making it necessary to extract the condensate formed in that heating action, to avoid a barrier to the transfer of heat to the body (2) of the roller during spinning operation, and subsequent deformation of the roller during stops, by the difference in heat transfer produced by the steam and the condensate in the areas with which they stay in contact.

The entry of steam into the inside chamber (1) of the roller is accomplished through a tube (3) set axially through one of the ends (4) that serve as spinning shafts, while the condensate evacuation outlet is set in a separation chamber (5) between said tube (3) and the corresponding axle piece (4).

Communication between the aforementioned evacuation chamber (5) and the heating chamber (1) is accomplished through a series of radial conduits (6) that reach the extreme periphery of the chamber (1).

According to the present invention, inside this communication between the condensate evacuation chamber (5) and the heating chamber (1), there is a ring-shaped cavity which shall be called housing (7), which is reached by the conduits (6) such that said housing (7) is connected to the chamber (1) through other conduits (8). These conduits (8) may be replaced by a continuous ring-shaped groove between the housing (7) and the extreme periphery of the chamber (1).

Figure 6:
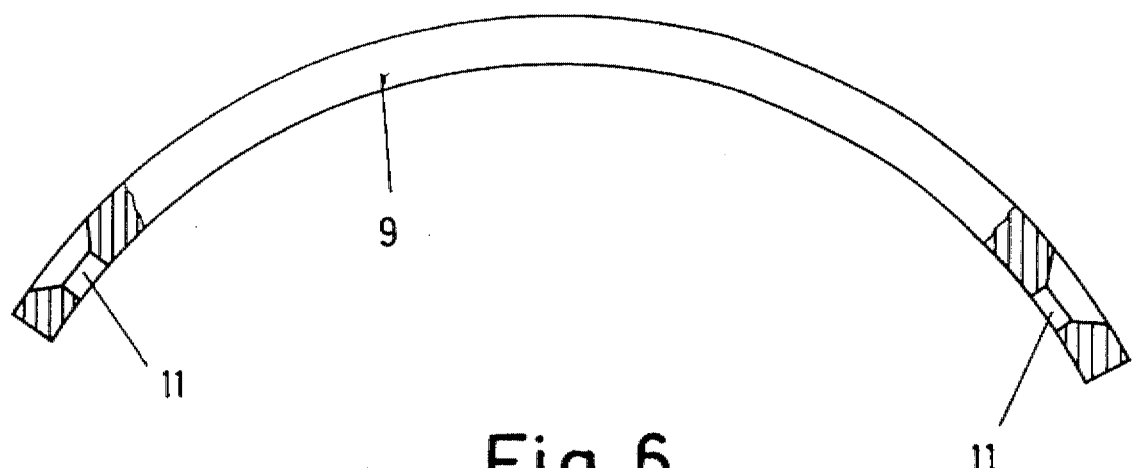
FIG. 6 is a side view of one of the segments or partial sectors of said compound ring.

According to this invention, a ring (9) is set in said housing (7), made up of several segments or sectors, such as that represented in FIG. 6. According to a preferred application, said ring (9) shall be composed of three independent sectors such as may be seen in FIGS. 8, 9, and 10, without however excluding the possibility of composition with any other number of sectors.

Figure 2:
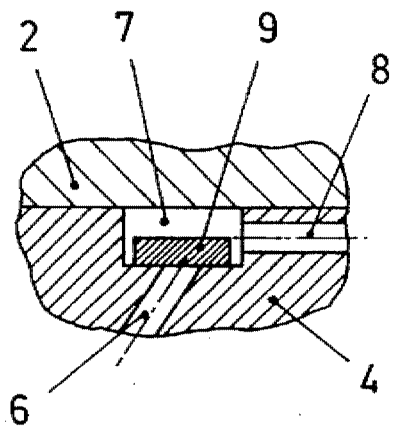
FIG. 2 shows an enlarged detail corresponding to the placement of the upper portion of the compound ring resting on the condensate outlet holes, when the roller is stopped.
Figure 4:
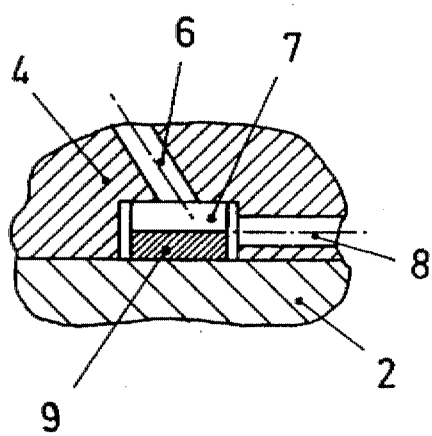
FIG. 4 is a detail that corresponds to the placement of the lower portion of the compound ring when the roller is stopped.

Said ring (9) is moreover given a certain amount of space for radial movement inside the housing (7), so that when the roller is stopped, the component sectors of the ring (9) that remain in the upper part fall, because of their own weight and by the action of gravity, onto the bottom of said housing (7), closing the conduits (6) with which they coincide, as represented by FIG. 2, while the sector or sectors that remain in the lower position stay in the outermost radial position without covering the respective conduits (6), as shown in FIG. 4.

Therefore, when the roller is stopped, only those conduits (6) in the lower area which nevertheless are covered by the level (10) of remaining condensates, remain open in whatever the stopped position may be, as represented in FIGS. 8, 9, and 10, so that in that position of roller stoppage, all the conduits (6) mentioned are closed, thus avoiding the loss of the steam that is in the chamber (1).

In order to ensure that the separations between the various sectors making up the ring (9) are always over the spaces in between the conduits (6) without coinciding with them, so that said closure of the various conduits (6) always be effective, the determining sectors of the ring (9) must be fixed, by means of holes (11), by screws or by another similar method, to the bottom of the ring housing (7), with enough play to permit their radial movement, but maintaining them at the same angle of position within said housing (7).

Figure 3:
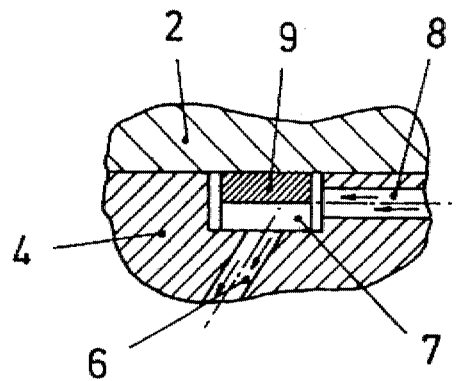
FIG. 3 is a detail like the preceding one which corresponds to the placement of the same upper portion of the compound ring when the roller is spinning at operating speed.
Figure 5:
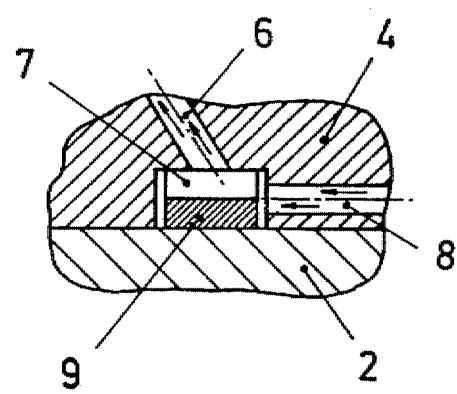
FIG. 5 is a detail that corresponds to the placement of said lover portion of the compound ring when the roller is spinning while operating.

When the roller spins at operating speed, the centrifugal force makes all sectors of the ring (9) move to the outermost radial position, as represented by FIGS. 3 and 5, so that all outlet conduits (6) are open; thus, allowing the discharge of the condensate out as well as the carrier steam, depending on the needs of operation.

According to the present invention, the inner chamber (1) of the rollers is built with a somewhat conical bore, wider at the end where the condensate outlets are, where there is furthermore a groove for drainage purposes (12) to concentrate the condensates in a convenient manner to facilitate evacuation.

In this manner, in said chamber (1) there is a difference in levels which facilitates movement of the condensates toward the collecting drain (12), so that whether the roller is stopped or spinning, the condensate flows rapidly toward said collecting drain (12).

This conical bore of the chamber (1) also causes the thickness of the condensate ring formed due to centrifugal force and to the spinning action to be uniform over the entire length of the chamber (1) when spinning, with the result that the transfer of hear from the heating steam to the body (2) of the roller takes place equally at all points, avoid heating differences along the roller and the resulting deformations and improper operation.

Figure 1:
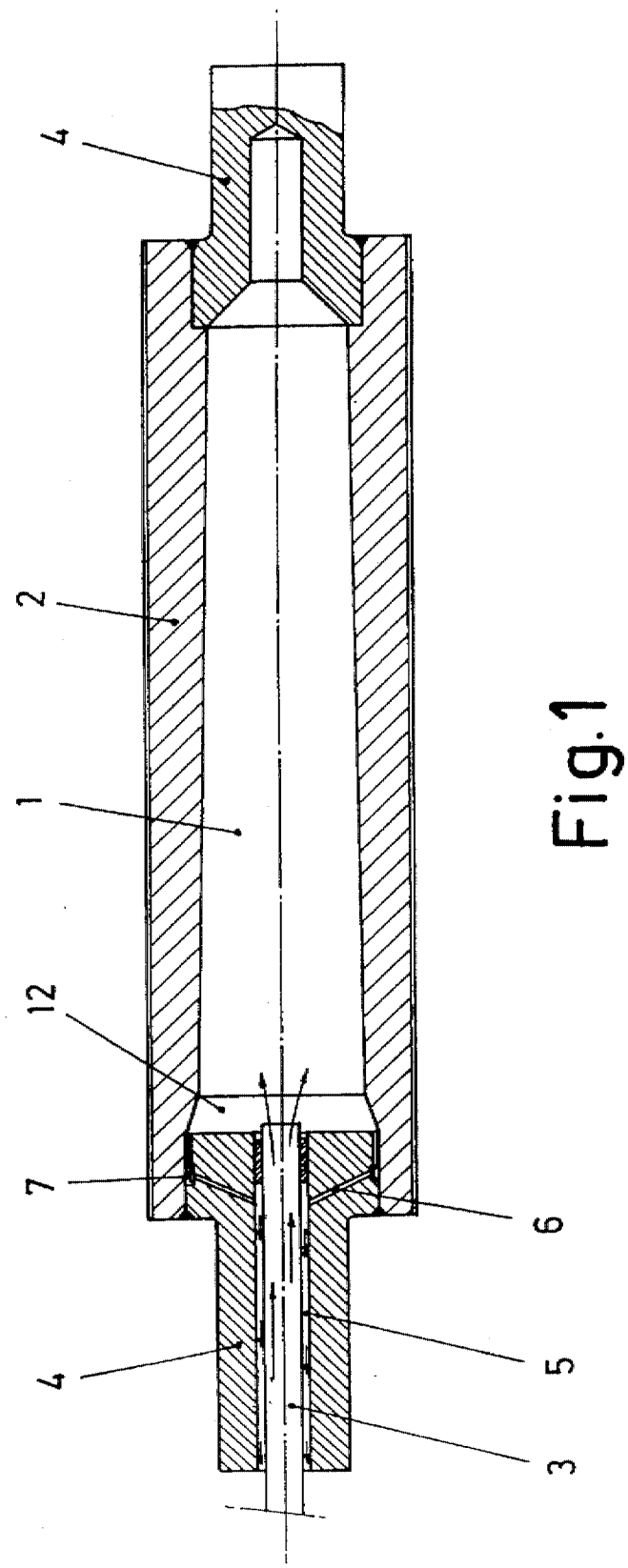
FIG. 1 represents a longitudinal section of a complete roller set with the announced improvements.
Figure 7:
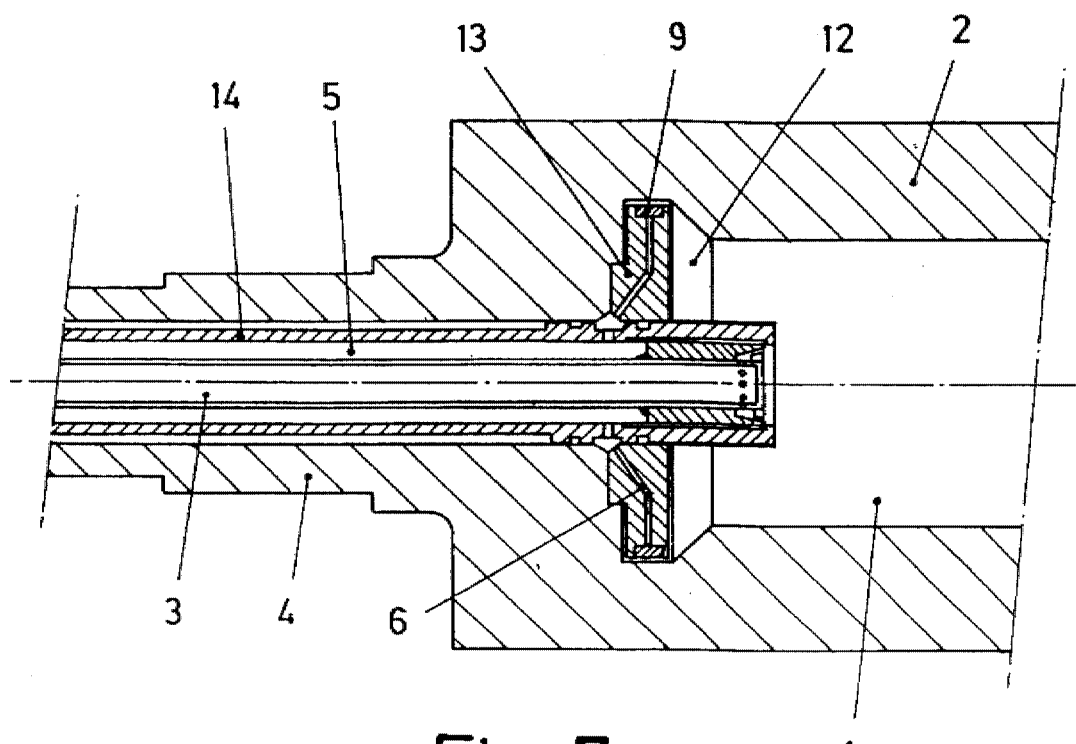
FIG. 7 is a partial view in cross section of the end of a roller with the same announced improvements, according to another possible application.

The condensate outlet conduits (6) may be incorporated in the axle piece (4) itself where the heating vapor intake tube (3) is found, as represented in FIG. 1; but by the same token, within the same concept of the present invention, a possible application in envisioned in which said conduits (6) are built through a detachable disk (13) set over a tubular rod (14), also detachable, as represented in FIG. 7, the ring housing (7) for the compound ring (9) being built in this case on the edge of said disk (13).

I claim:

1. A steam-heated corrugating roller comprising:
   an inner chamber in which the heating steam is introduced;
   condensate outlet conduits, placed into one end of said chamber, to let out condensates;
   a ring housing which is reached by said condensate outlet conduits and in which there is a ring made up of several independent sectors, the independent sectors that make up the ring are set inside the ring housing with the possibility of radial movement between two extreme positions, one in which they rest on the bottom of the housing, thus closing off the conduits, and the other in which they occupy the position furthest removed from said bottom, thus leaving open said conduits, such that when the roller is stopped, the determinant sectors of the ring occupy by their own weight a stable position; whereas when the roller spins, the sectors of the ring move by centrifugal action to the position furthest removed from the bottom of the housing.

2. A steam-heated corrugating roller, in agreement in every respect with the previous claim, wherein each sector that makes up the ring is united to one of the parts that make up the ring housing, using means that preclude the movement of such sectors around the theoretical longitudinal axis of the roller, but which allow said movement in the radial direction of such sectors.

3. A steam-heated corrugating roller, in agreement in every respect with the first claim, wherein the inner chamber of the roller includes a somewhat conical bore that widens in the direction of the conduits, thereby establishing a slope that facilitates the movement of the condensates toward the conduits; and because in the end containing the condensate outlets, said chamber is widened by a drainage groove for the collection of condensates.

4. A steam-heated corrugating roller, in agreement in every respect with the first claim, wherein the ring housing for the ring and the condensate outlet conduits are built directly into the axle piece itself; or over a detachable disk (13) set over a tubular rod.

5. A steam-heated corrugating roller according to claim 1, wherein the ring housing for the ring and the condensate outlet conduits are built over a detachable disk set on a tubular rod.

* * * * *

UNITED STATES PATENT AND TRADEMARK OFFICE
CERTIFICATE OF CORRECTION

PATENT NO. : 5,671,549
DATED : Sep. 30, 1997
INVENTOR(S) : Desiderio Garcia Jimenez It is certified that error appears in the above-identified patent and that said Letters Patent is hereby corrected as shown below:

On the Title page, item [73] Assignee:

"Talleres Irunes, S.A." should read

--Talleres Iruna, S.A.--

Signed and Sealed this

Twentieth Day of January, 1998

*Attest:*

BRUCE LEHMAN

*Attesting Officer*     *Commissioner of Patents and Trademarks*